(12) United States Patent
Buehler et al.

(10) Patent No.: US 10,929,407 B2
(45) Date of Patent: Feb. 23, 2021

(54) DYNAMIC AND ADAPTIVE CONTENT PROCESSING IN CLOUD BASED CONTENT HUB

(71) Applicant: International Business Machines Corporation, Armonk, NY (US)

(72) Inventors: Dieter Buehler, Tuebingen (DE); Matthias Falkenberg, Stuttgart (DE); Uwe Hansmann, Tuebingen (DE); Daniel Kaulen, Boeblingen (DE); Stefan Koch, Dornhan (DE); Timo Kussmaul, Boeblingen (DE); Stephan Laertz, Herrenberg (DE); Udo Schoene, Boeblingen (DE); Thomas Steinheber, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/828,277

(22) Filed: Nov. 30, 2017

(65) Prior Publication Data

US 2019/0163793 A1    May 30, 2019

(51) Int. Cl.
*G06F 16/2457* (2019.01)
*G06Q 10/10* (2012.01)
*G06F 16/14* (2019.01)
*G06F 16/21* (2019.01)
*G06F 16/215* (2019.01)

(52) U.S. Cl.
CPC ........ *G06F 16/24573* (2019.01); *G06F 16/14* (2019.01); *G06F 16/21* (2019.01); *G06F 16/215* (2019.01); *G06Q 10/103* (2013.01)

(58) Field of Classification Search
CPC .. G06F 16/24573; G06F 16/215; G06F 16/21; G06F 16/14; G06Q 10/103
USPC .................................................. 707/769, 608
See application file for complete search history.

(56) References Cited

U.S. PATENT DOCUMENTS

| 8,543,457 B2 * | 9/2013 | Staib ...................... G06Q 30/02 705/14.52 |
| 8,812,660 B2 * | 8/2014 | Rowlands .............. G06Q 50/06 709/224 |
| 9,183,259 B1 | 11/2015 | Marra et al. |

(Continued)

OTHER PUBLICATIONS

Author Unknown, Arbortext® Publishing Engine™, Data Sheet, 2009, pp. 1-2, Parametric Technology Corporation (PTC), Needham, MA, USA.

(Continued)

*Primary Examiner* — Michael Pham
(74) *Attorney, Agent, or Firm* — Christopher M. Pignato; Nicholas L. Cadmus (57) ABSTRACT

A trigger message indicative of a potential change to a publishing workflow is received. The trigger message is processed, resulting in a workflow modification message that includes a content item identifier, a related semantic identifier indicative of a semantic of the workflow modification message, and workflow characterizing metadata. The publishing workflow is retrieved by selection using the workflow characterizing metadata. At least one publishing workflow action of the retrieved publishing workflow is modified based on the workflow modification message, and the modified publishing workflow is executed.

18 Claims, 7 Drawing Sheets

(56) References Cited

U.S. PATENT DOCUMENTS

| | | |
|---|---|---|
| 2012/0116836 A1* | 5/2012 | Flores ................ G06Q 10/0633 705/7.27 |
| 2014/0101182 A1* | 4/2014 | Roy ....................... G06F 16/93 707/756 |
| 2015/0288757 A1 | 10/2015 | Larabie-Belanger |
| 2015/0370467 A1* | 12/2015 | Holmes-Higgin .... G06F 3/0481 715/738 |
| 2016/0080485 A1 | 3/2016 | Hamedi |
| 2016/0353140 A1* | 12/2016 | Miller ................. H04L 65/4076 |
| 2016/0378575 A1* | 12/2016 | Hansen ................. G06Q 10/06 719/318 |
| 2017/0278066 A1 | 9/2017 | Chakravarty |
| 2018/0275985 A1 | 9/2018 | Hansen |

OTHER PUBLICATIONS

Author Unknown, Teamcenter for Content Management, Fact Sheet, 2007, pp. 1-3, Siemens Product Lifecycle Management Software Inc., USA.

* cited by examiner

DYNAMIC AND ADAPTIVE CONTENT PROCESSING IN CLOUD BASED CONTENT HUB

BACKGROUND

The invention relates generally to a method for modifying a workflow, and more specifically, to a method for modifying a publishing workflow of a content management system. The invention relates further to a related system for modifying a publishing workflow of a content management system, and a computer program product.

Creating and managing content of any kind has become a predominant requirement in modern enterprises. The digitization of all businesses—including Internet-only shops—require a constant update and adaptation of existing content as well as the creation of new content relating to new products and services. Modern enterprise-scale content management systems (CMS) are often based on separate content authoring and content delivery systems. Thereby, different requirements of content creation and retrieval tasks (e.g., towards the data model, and availability and caching) may be met. The process responsibility for creating, modifying, and editing content takes typically place in the authoring system and is referred to as authoring. The process responsible for transferring content from the authoring system to the delivering system is referred to as publishing. The content is either transferred as-is (e.g., text, video, images, static files) or is transformed (e.g., pre-render templates) to better suit delivery use-cases.

Prior art publishing engines are usually triggered by one of the following events: (A) a content author manually changes the state of a content item in the authoring system (e.g., from "draft" to "ready"), (B) a content author explicitly triggers the (un-)publication of one or more content items, (C) the time for publication is reached (which may be manually configured via a dedicated publishing schedule).

All of the above trigger conditions require conscious user decisions as to how the content is edited; and when the content is published to, or removed from, a content delivery system.

Typical content management systems do not take into account actual network activities. The responsibility for priority setting is always on the author community. Thus, traditional content management systems lack the ability to automate complex authoring and publishing tasks.

SUMMARY

According to one aspect of the subject matter described herein, a method for modifying a publishing workflow of a content management system includes receiving a trigger message indicative of a potential change to a publishing workflow, and processing the trigger message resulting in a workflow modification message. The workflow modification message may include a content item identifier, a related semantic identifier indicative of a semantic of the workflow modification message, and workflow characterizing metadata. The publishing workflow is retrieved by selection using the workflow characterizing metadata. At least one publishing workflow action of the retrieved publishing workflow is modified based on the workflow modification message, and the modified publishing workflow is executed.

According to another aspect of the present invention, a system for modifying a publishing workflow of a content management system may be provided. The system may include a receiving unit adapted for receiving a trigger message indicative of a potential change to a publishing workflow and a processing unit adapted for processing the trigger message resulting in a workflow modification message. The workflow modification message may include a content item identifier, a related semantic identifier indicative of a semantic of the workflow modification message, and workflow characterizing metadata. The system may additionally include a retrieval module adapted for retrieving the publishing workflow by selection using the workflow characterizing metadata, a dynamic workflow modification module adapted for modifying at least one publishing workflow action of the retrieved publishing workflow based on the workflow modification message, and a workflow engine adapted for executing the modified publishing workflow. One or more processors may be programmed to perform the processing of the system.

Furthermore, embodiments may take the form of a related computer program product, accessible from a computer usable or computer readable storage medium providing program code for use, by or in connection with a computer or any instruction execution system. A computer usable or computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

BRIEF DESCRIPTION OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the subject matter described herein, are apparent from the examples of embodiments to be described hereinafter and are explained with reference to the examples of embodiments, but to which the subject matter is not limited.

Preferred embodiments of the subject matter will be described, by way of example only, and with reference to the following drawings.

DETAILED DESCRIPTION

In the context of this description, the following conventions, terms and/or expressions may be used.

The term "content management system" (CMS) may denote a computer application supporting the creation and modification of digital content—in particular content items. It may often be used to support multiple users working in a collaborative environment. CMS features may vary widely. Most CMSs include Web-based publishing, format management, history editing and version control, indexing, search, and retrieval. By their nature, content management systems may support the separation of content and presentation.

Also web content management systems (WCM or WCMS) may be viewed as CMS designed to support the management of the content of web (World Wide Web) pages. Most popular CMSs are also WCMSs. Web content may include text and embedded graphics, photos, videos, audio, maps, and program code (e.g., for applications) that may display content or interacts with the user. Each element of this web content may be denoted as content items. Such a content management system (CMS) typically has two major components: a content management application (CMA) is the front-end user interface that allows a user, even with limited expertise, to add, modify, and remove content from a web site without the intervention of a webmaster; and a content delivery application (CDA) compiles that information and updates the website.

Digital asset management systems may be seen as another type of CMS. Digital asset management systems manage things such as documents, movies, pictures, phone numbers, and scientific data. CMSs may also be used for storing, controlling, revising, and publishing documentation.

The term "publishing workflow" may denote—in the sense of the above-mentioned definitions—a sequence of actions (i.e., a process) responsible for transferring content items from the authoring system to the content delivery system.

The term "authoring system" may denote the content management application, as explained above, and allowing the creation and modification of content items.

The term "content delivery system" may denote—in the sense of the above-mentioned definition—a system for enabling an access to content items via a proprietary or a public—e.g., the Internet—network.

The term "trigger message" may denote a signal—in particular in a form of a digital message comprising a plurality of characters—that may be generated based on predefined conditions. These predefined conditions may relate to an unplanned high activity regarding a specific theme on the Internet or social media network activities and/or access to one or more predefined content items. Other trigger mechanisms—i.e., trigger messages—may also be used instead.

The term "semantic identifier" may denote a key identifying a specific logical grammar of how to interpret a specific message, in particular the workflow modification message.

The term "workflow" may consist of an orchestrated and repeatable pattern of activity enabled by the systematic organization of resources into one or more processes that transform materials, provide services, and particularly process information. Originally, the workflow may be depicted as a sequence of operations, declared as work of a person or group. From a more abstract or higher-level perspective, a workflow may be considered a view or representation of real work. The flow being described may refer to a document/content item (or a service or a product) that is being transferred from one step or status to another, in particular a content item in the flow from being created to the status of being published and made available for an access over a network.

The term "workflow engine" may denote a software application that may manage processes. It is a key component in workflow technology and typically makes use of a database server. A workflow engine may manage and monitor the state of activities in a workflow, such as the processing and approval of a content item publishing process, and may determine which new activity may be required to transition the content item according to a defined or modified publishing process (workflows). An individual activity within the workflow may be denoted as workflow action or, simply action.

The term "workflow modification message" may denote a series of characters—in particular a string—in a notion enabled to change a workflow template or an existing workflow. Hence, defined actions in the workflow may be modified, deleted or newly added to the workflow.

The term "workflow characterizing metadata" may denote data characterizing the meaning and semantic of other data—here, the data describing the workflow and/or workflow actions, in particular the publishing workflow. The workflow characterizing metadata may relate to a specific notion, e.g., BPEL.

The term "BPEL" may denote the Web Services Business Process Execution Language (WS-BPEL), commonly known as BPEL (Business Process Execution Language), which is an OASIS (Organization for the Advancement of Structured Information Standards) standard executable language for specifying actions within workflows with web services. Processes in BPEL may export and import information by using web service interfaces exclusively.

The term "workflow control construct" may denote structural elements of a workflow defined between specific workflow actions. Examples of workflow control constructs may be if/then/else statements, loop definitions, conditions on time and/or events, and so on.

The term "fuzzy search technique"—also called approximate string matching (often colloquially referred to as fuzzy string searching)—may denote the technique of finding strings that match a pattern approximately (rather than exactly). The problem of approximate string matching is typically divided into two sub-problems: finding approximate substring matches inside a given string and finding dictionary strings that match the pattern approximately.

The proposed method for modifying a publishing workflow of a content management system may offer multiple advantages and technical effects.

The proposed technical approach may enable an automatic reaction of the content management system—in particular the publishing portion—to react automatically to changing situations regarding network activities—in particular in respect to content themes in high demand or specific content items which experience a high request rate. Additionally, the newly proposed system and method may also react to specific author activities regarding a specific content theme or authoring activities in respect to a specific content item. Modern technologies like cognitive systems may be used to interpret specific activities—for example, of theme developments over time in social media networks— on the Internet or high update frequencies of dedicated content items by one or more authors.

The proposed method and system may be enabled to automatically execute a publishing process regarding content items. Moreover, depending on environmental parameters—like input from the Internet in the sense of a request counter or specific activities in one or more social media networks—the proposed method and the related system may be enabled to select, and also modify, a publishing workflow for content items. Hence, the system may be enabled to select a best-fit workflow to process content, adapting to changing request loads, social network activities, content authoring activities, and so on. Thus, the workload of authoring and publishing personnel can be reduced significantly. Thereby, operating costs as well as error prone and expensive manual user efforts related to processing content items—for example, triggering or scheduling (un-)publication—may be reduced. Consequently, the consistency, regularity and compliance consistency of publishing processes of content items may be enhanced. The publishing frequency may be increased driven by unplanned and surprising events which may be detected automatically—like a natural disaster, suddenly happening geo-political imbalances or other surprising news—so that also content item publishing may be increased automatically even if human resources for managing the authoring publishing and delivery process may only be available in a limited amount, e.g., during night hours.

In order to stay within predefined limits regarding the automatic changes to the workflow process, a rules engine may be available for: (a) enabling the automatic changes to the publishing workflow process, and (b) safeguarding that the automatic changes to the publishing workflow process do not get out of control. This way, compliance requirements may be met.

In the following, additional embodiments of the proposed method—also applicable for the related system—will be described.

According to one preferred embodiment of the method, the trigger message may be received from a social media network analyzer, a content request metering component or, the content management system. The last point may be determined by monitoring activities of an author using the authoring tool. Thus, unusual activities of content processing and content consumption that show anomalies may be detected automatically, leading to a potential publishing workflow change.

According to one advantageous embodiment of the method, the processing of the trigger message may be performed using a cognitive sub-system, history sub-component and/or a rules sub-component. These components may take over specific and dedicated roles in the processing of the incoming message.

According to one additional embodiment of the method, modifying the at least one workflow action of the publishing workflow comprise at least a workflow action selected out of the group comprising an action for a content modification—like modifying a keyword, categorizing the content item, etc.—an action for the transferring the content item to the content delivery system (like, e.g., a content distribution product like a product from a content distribution network provider like Akamai—an action for an un-publishing the content item by the content delivery system, an action for modifying a state of an authoring component—e.g., request editing of a content item from a content author—an action for modifying a ranking model of a search component related to the content item—i.e., the search component providing functionality to search for content items relating to the content item—an action for waiting on an event from the content delivery system—e.g., a content distribution system may send an event after a content item is successfully published—and an action for retrieving content data from a component of the content management system or another system—e.g., a content template. It may be noted that this list is not complete and other suitable actions may be selected.

According to one optional embodiment of the method, the publishing workflow is defined using BPEL. Hence, the proposed concept may work well as industry standard business process execution languages. However, any other workflow code may be used.

According to one optional embodiment of the method, the modifying the retrieved publishing workflow may comprise one selected out of the group comprising inserting, modifying, removing and rearranging representations of at least one workflow action and a representation of at least one workflow control construct. This may, e.g., be an IF/THEN/ELSE statement, a loop statement, and event trigger, etc., (more details are given below).

According to one permissive embodiment, the method may also comprise storing the trigger message in a history database. This may allow comparing a newly incoming trigger message with already stored trigger messages. If the same, or a similar, trigger message came in earlier to the dynamic publishing engine, the new trigger message may be ignored. Again, also here the similarity may be determined by a cognitive engine.

According to one further optional embodiment, the method may also comprise comparing the content of the trigger message with a threshold value. This may be performed by the rule component and/or the cognitive system and/or the history component of the dynamic publishing engine. Thus, only relevant changes in network activities (e.g., Internet, social media network) may trigger a workflow modification.

According to one preferred embodiment of the method, an authoring component and the content delivery system may be non-integrated. Thus, the three components authoring system, publishing engine and content delivery system may be separated and may be delivered by different vendors. This may allow a high flexibility in terms of sourcing for enterprises.

According to another advantageous embodiment of the method, the retrieving the publishing workflow may comprise searching a workflow in a workflow database using a fuzzy search technique. Hence, different techniques for identifying a suitable workflow for a modification may be implemented as part of the proposed concept.

In the following, a detailed description of the figures will be given. All instructions in the figures are schematic. Firstly, a block diagram of an embodiment of the inventive method for modifying a publishing workflow of a content management system is given. Afterwards, further embodiments, as well as embodiments of the system for modifying a publishing workflow of a content management system, will be described.

Figure 1:
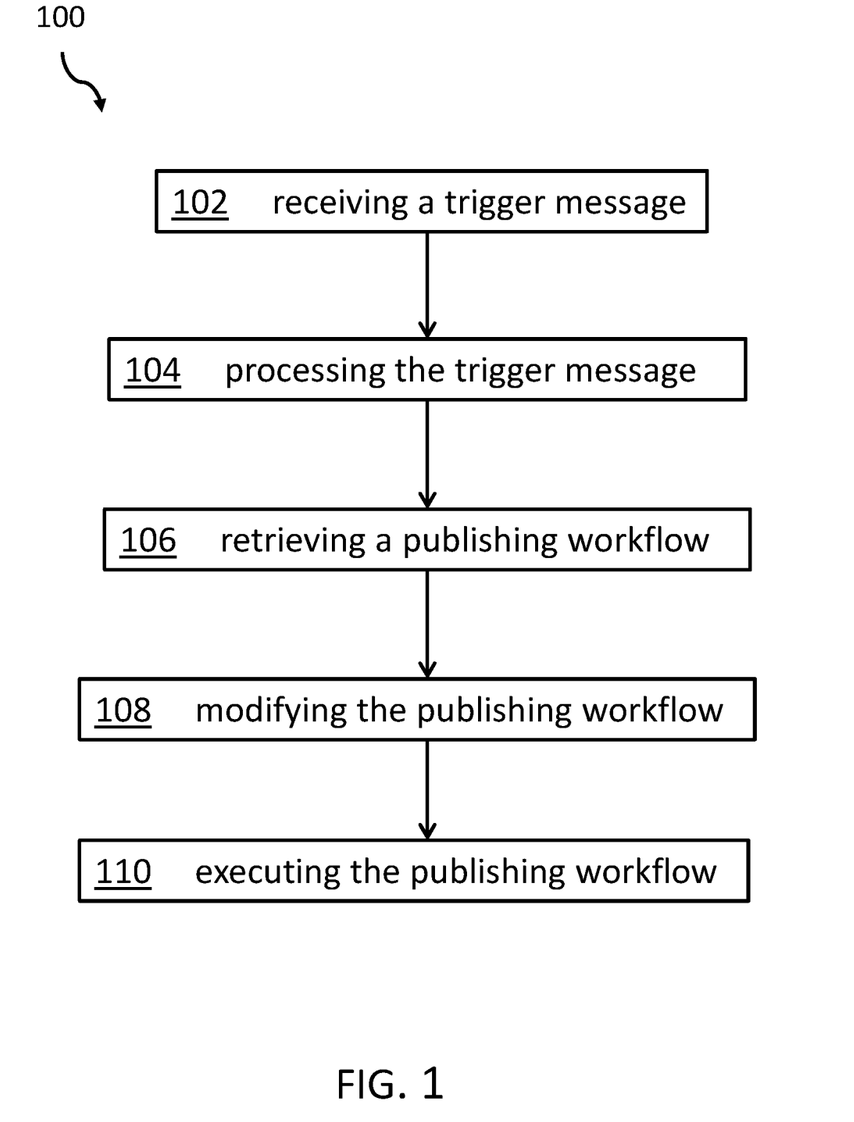
FIG. 1 shows a block diagram of an embodiment of an inventive method for modifying a publishing workflow of a content management system.

FIG. 1 shows a block diagram of an embodiment of the method 100 for modifying a publishing workflow of a content management system. The method 100 comprises receiving, 102, a trigger message—e.g., from the social network analyzer or a request metering or the CMS itself—indicative of a potential change to a publishing workflow. One or more threshold values may be used to determine that a workflow modification may not be required.

The method 100 comprises further processing, 104, the trigger message resulting in a workflow modification message. The workflow modification message comprises a content item identifier, a related semantic identifier indicative of a semantic of the workflow modification message, and workflow characterizing metadata. Furthermore, the method 100 comprises retrieving, 106, a publishing workflow selectable by the workflow characterizing metadata, modifying, 108, at least one publishing workflow action of the retrieved publishing workflow based on the workflow modification message and executing, 110 the modified publishing workflow. The start of the publishing workflow may happen automatically and with no human intervention.

Figure 2:
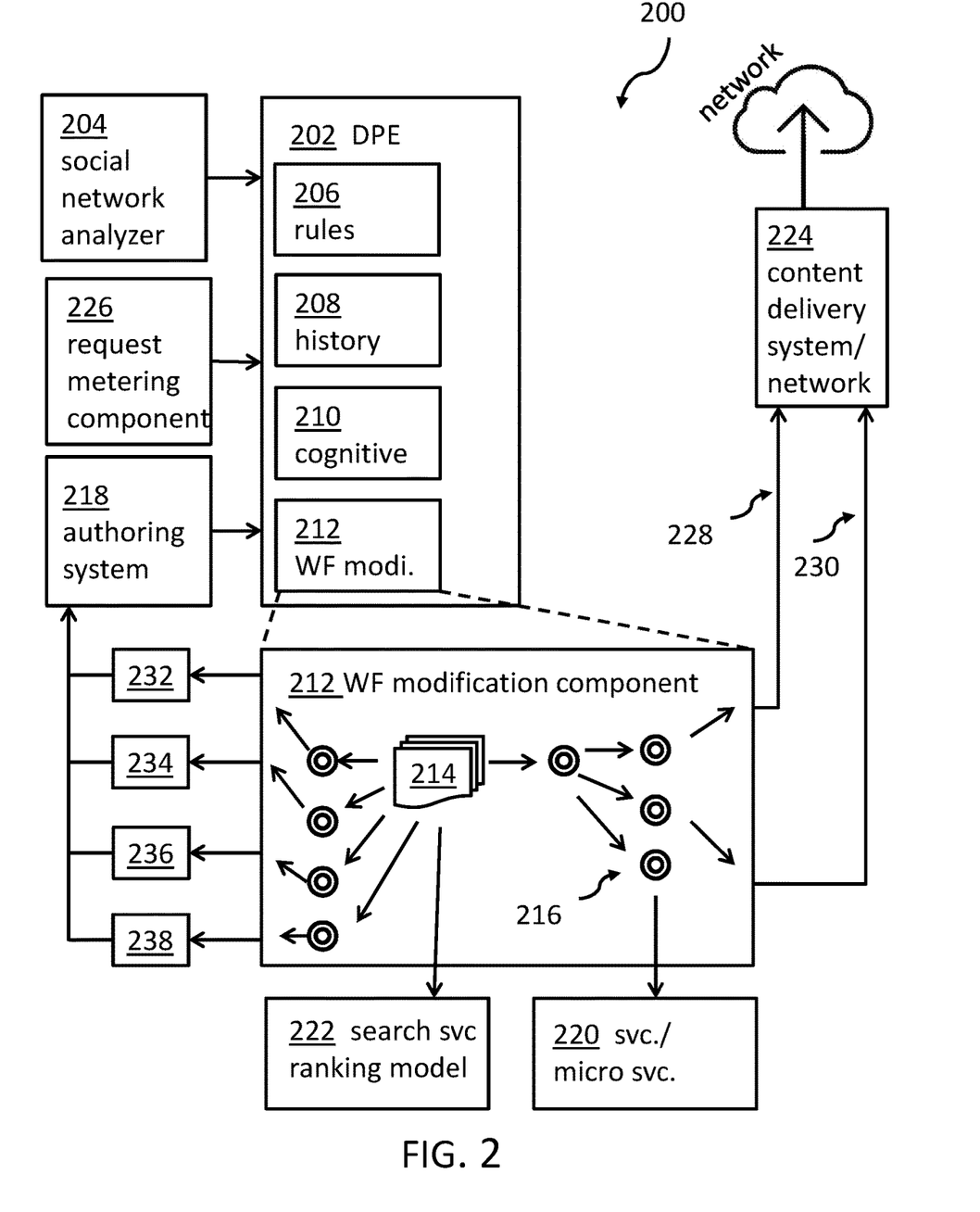
FIG. 2 shows a block diagram of an embodiment of core components of a dynamic publishing engine, as well as surrounding components.

FIG. 2 shows a block diagram 200 of an embodiment of core components of the dynamic publishing engine (DPE) 202 and surrounding components of a more complete content management system. The example CMS provides, e.g., content such as concert tickets, music clips, CDs, online music streams, life recordings, and/or fan articles of many popular artists. It may also provide an online forum where fans can exchange information about fan articles. In this example, a famous popstar—let's name her "Justine"—announces to give a concert in New York on Saturday in two weeks.

The social network analyzer component 204 may use social network analysis functionality to monitor and analyze social media networks, such as Facebook®, Twitter®, BLOGs, and so on. It may detect a pattern of high and increasing numbers of posts comprising hashtags or keywords containing "Justine." It analyzes the tone of the posts (positive or even enthusiastic) and performs a semantic analysis of posts. This analysis reveals, e.g., that most posts have referred to the location New York and date Feb. 10, 2018, Time: 8:00 PM.

The social network analyzer component 204 creates therefore a new signal or message since the velocity of new posts exceeds a defined limit and sends this message to the dynamic publishing engine 202. Here, the message comprises the name of the artist, a metric quantifying the social network activity, the location and the date. These parameters are used in this example as network activity parameters transferred from the social network analyzer component 204 to the dynamic publishing engine 202.

For example: event: category: high-velocity-social activity, number of tweets in the last 24 hours: XXX, name: Justine, location: New York, date: Feb. 10, 2018, Time: 8:00 PM. The portion "XXX" may refer to any number of tweets, blog posts or other social media activities measured in the given amount of time.

Alternatively, the request metering component 226 may generate the trigger message.

The rules sub-component 206 controls and matches administrator defined rules which define how messages should be processed. The rules are defined using known business rules representation. Here, the rules sub-component 206 determines the set of words that are defined for this event category and then processes the rules. In this pseudo-code example the rules read as follows:

```
IF category == high-velocity-social activity THEN {
invoke cognitive subcomponent to process the event (this processing
includes validating the input message, determining and categorizing
the event object, location and date, selecting the workflow, and finally
modifying the event by adding all this information); invoke history
sub-component to start event and reject processing if identical event
(i.e., event with identical event date, event object category, event
location) was received previously;
invoke the workflow modification component to create the workflow
}.
```

The rules sub-component 206 invokes a business rules engine, passing this rule. The rules engine processes the rules and invokes the cognitive sub-component 210.

The cognitive sub-component 210 first checks the type of the message and rejects unknown messages. It then invokes a cognitive engine to determine and categorize the event object—i.e., here, popstar "Justine"—date and location are directly retrieved from the input signal. It then selects the appropriate workflow which comprises all the functionality for reacting to the message. This election is done by using natural language processing to match the event object and event object category to the metadata of the workflow—e.g., keyword matching between popstar and the administrator defined title or description of the exemplary workflow template "popstar concert promotion workflow templates." In the here used example, it selects this workflow: advertisement-pop-concert-template.

The cognitive sub-component 210 may also create a set of additional parameter values which are relevant for this message. The parameter values as well as object, category, location, date, workflow name are added to the message, thus modifying or transforming the incoming message to the dynamic publishing engine 202.

The rules sub-component 206 then invokes the history sub-component 208 to process the message. It does so, by storing the message. The history sub-component 208 then determines if this message was already processed before. It may be assumed that this is not the case here, and the dynamic publishing engine 202 continues to process the message normally.

The rules sub-component 206 then invokes the workflow modification sub-component 212 which is expanded in the lower part of FIG. 2 indicated by the dashed explosion view lines. In the enlarged workflow modification sub-component 212, a plurality of content items 214 are shown together with a plurality of workflow actions 216, indicated by a double circle each. For comprehensibility reasons, not all shown workflow activities 216 have their own reference numeral.

The workflow modification sub-component 212 may generate a new workflow by modifying an existing workflow either from a template or from an already used workflow. A retrieval of the workflow may be supported by metadata generated by the dynamic publishing engine 202. The actions 216 of the workflow define activities performed on the content items 214 for an automatic creation, modification and/or publication of the content item. Also, other activities may be defined by the actions 216 of individual workflow steps.

Typically, the workflow modification sub-component 212 creates the workflow by modifying an existing workflow or a workflow template. The created workflow is represented in a workflow definition language like BPEL or similar. In other words, the workflow modifications sub-component 212 creates the set of BPEL instructions which define the new/modified workflow. The workflow may comprise activities to interact with the authoring system 218, a potentially external publishing system (not shown) and/or other external systems (like micro-services 220, search services 222) or to read and analyze other signals.

In the here used example, the workflow modification sub-component 212 creates a new workflow which automates the creation, modification and publication of content items. The workflow detects the date of the concert and the high number of social network posts (from the incoming message to the dynamic publishing engine). The workflow also comprises logic to decide about control flow and data flow. It determines to promote the sale of concert tickets on the main page of the web site with a frequency that depends on the browser location of the website visitor. Web site visitors from the New York area would see the concert ticket sale prominently.

In this example, the workflow is generated by modifying an advertisement-pop-concert workflow template. This workflow template comprises a set of points of variabilities which are resorted by the workflow generation component by inserting parameter values taken from the messages. The workflow template is created by an administrative user beforehand and is represented using a workflow definition language (e.g., BPEL)

The workflow creates a new project to prepare the prominent publishing of the concert ticket sales.

As examples, it adds the following content to the project:
a ticket sales template,
the main page referring to the ticket sales template,
a display title: get your ticket for Justine, Feb. 10, 2018, New York
a photo showing the artist during an un-stage performance,
a description comprising the location "International Music Center" at the start time 8:00 pm
a geo tag for New York City,
a publishing date: now,
an expiration date: Feb. 10, 2018, and
a link to the ticket sales page.

A workflow control component forwards the project to an editor who may, e.g., perform the following actions:
replacement of the on-stage photo with a new one based on the text "Justine" and "life act,"
editing of the description, and
changes to title to "Justine life on tour," New York, Feb. 10, 2018.

The editor saves and completes the changes. Then, the workflow control component creates and publishes the web site which allows visitors from the New York area to receive the ticket sale announcement immediately. Website visitors from other places, or unidentified places, receive announcements either specific to the areas or a selection of major events.

The workflow sets a timeout for Feb. 10, 2018 midnight to initialize a removal of the ticket sale advertisement automatically. A timer then triggers the workflow at Feb. 10, 2018 midnight.

Figure 3:
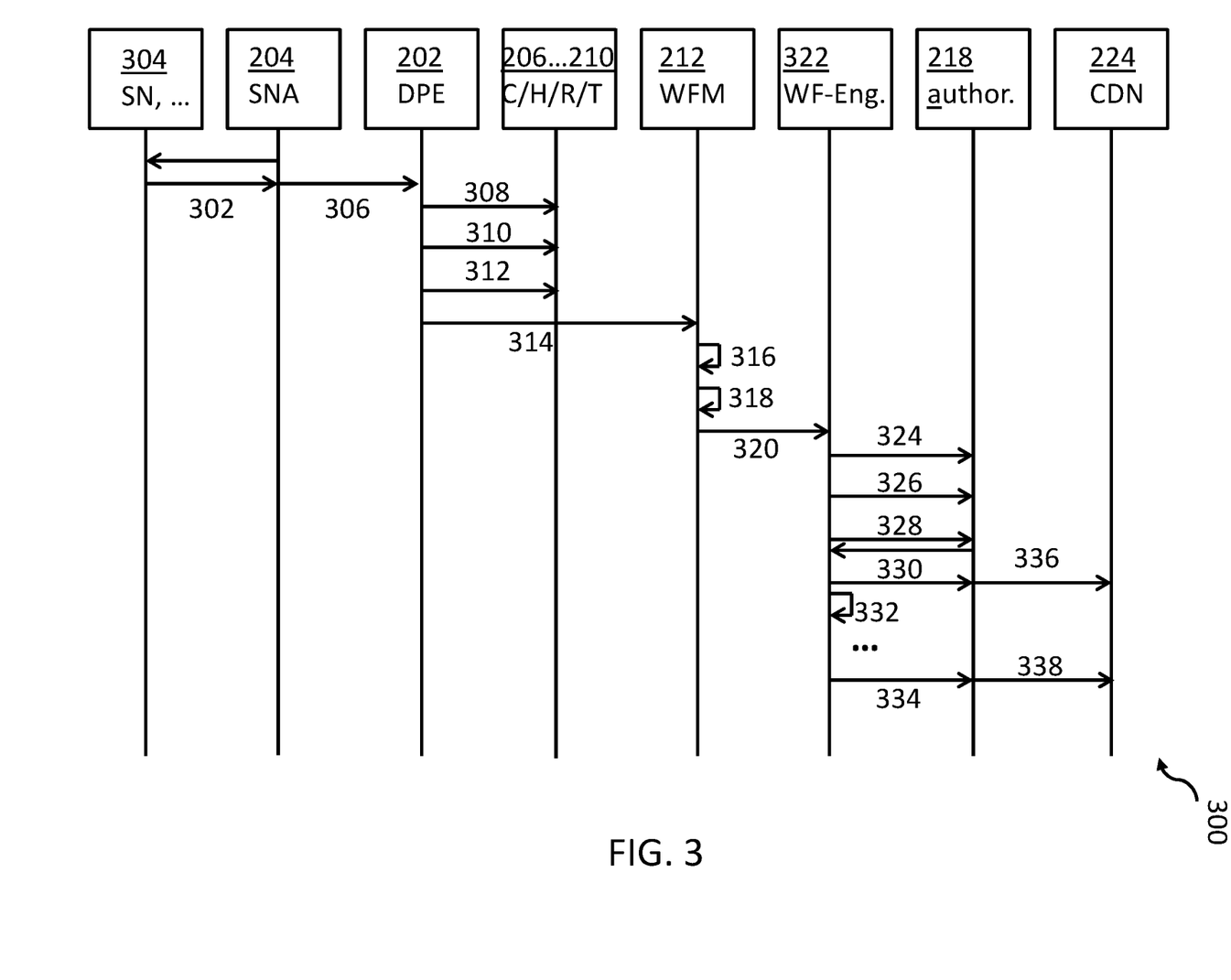
FIG. 3 shows a block diagram of an exemplary message exchange diagram in a generalized form.

This exemplary flow of actions and message exchanges is shown in a more abstract diagram in FIG. 3.

Other elements in FIG. 2 may be described in short here: a workflow engine, underlying the workflow, may, according to one workflow action, publish, 228, a specific content item to the content delivery system/network 224. Equivalently, another workflow action may initiate an "un-publication" 230 of a content item.

Other workflow actions that may be influenced by the workflow modification sub-component 212 may relate to the following:
a modification, 232, of a ranking model of the surge component. As a background: the published content item may comprise an input field for a specific search engine. The search activities may be conditioned to the content of the content item for the search engine. In the here used example, search results relating to pop concerts, pop stars, etc., may be increased in their ranking;
retrieving, 234, data for a content item;
modifying, 236, of (meta-) data of a workflow component; and
modifying, 238 the state of the authoring system 218. This may, e.g., be related to the requirement of a manual editing requirement to a content item of moving the content item to the status of, e.g., "edited/ready to be released/to be published".

FIG. 3 shows a block diagram of an exemplary message exchange diagram 300 in a generalized form for the discussed example of FIG. 2. The social network analyzer component 204 identifies 302 trending topics/themes and social networks 304, blog posts and the like. The social network analyzer component 204 then submits, 306, a signal "event . . . " to the dynamic publication engine 202, which in turn invokes the sub-components rules 206, history 208, cognitive 210 and workflow modification 212. It may be noted that the "T" may denote a workflow Template.

Alternatively, or in addition, a request metering component 226 may have analyzed an access of a specific content item—in this case, e.g., the homepage of the pop star—and may have determined that a predefined threshold value has been exceeded. Also, such a message would be transmitted to the dynamic publication engine 202.

Thus, the dynamic publication engine 202 invokes the rules 308, invokes the history 310, invokes the cognitive analysis 312, and invokes the workflow modification process 314. The workflow modification component 212 retrieves, 316, a workflow template, composes and invokes, 318, the workflow engine 322 starts, 320, the workflow.

The workflow engine creates, 324, a project, populates, 326, the project, sends, 328, a task to an editorial (and receives feedback), triggers, 330, the project publication, schedules, 332, a revocation ("un-publication") of the related content item when the scheduled point in time is reached and, triggers, the revocation of the content item.

After the workflow engine 322 has triggered, 330, the project publication, the authoring system 218 publishes, 336, the "event" promotion. Additionally, after the workflow engine has triggered, 334, the revocation of the content item, the authoring system 218 un-publishes, 338, the "event" promotion by a message to the content distribution network or content distribution system 224.

Figure 4:
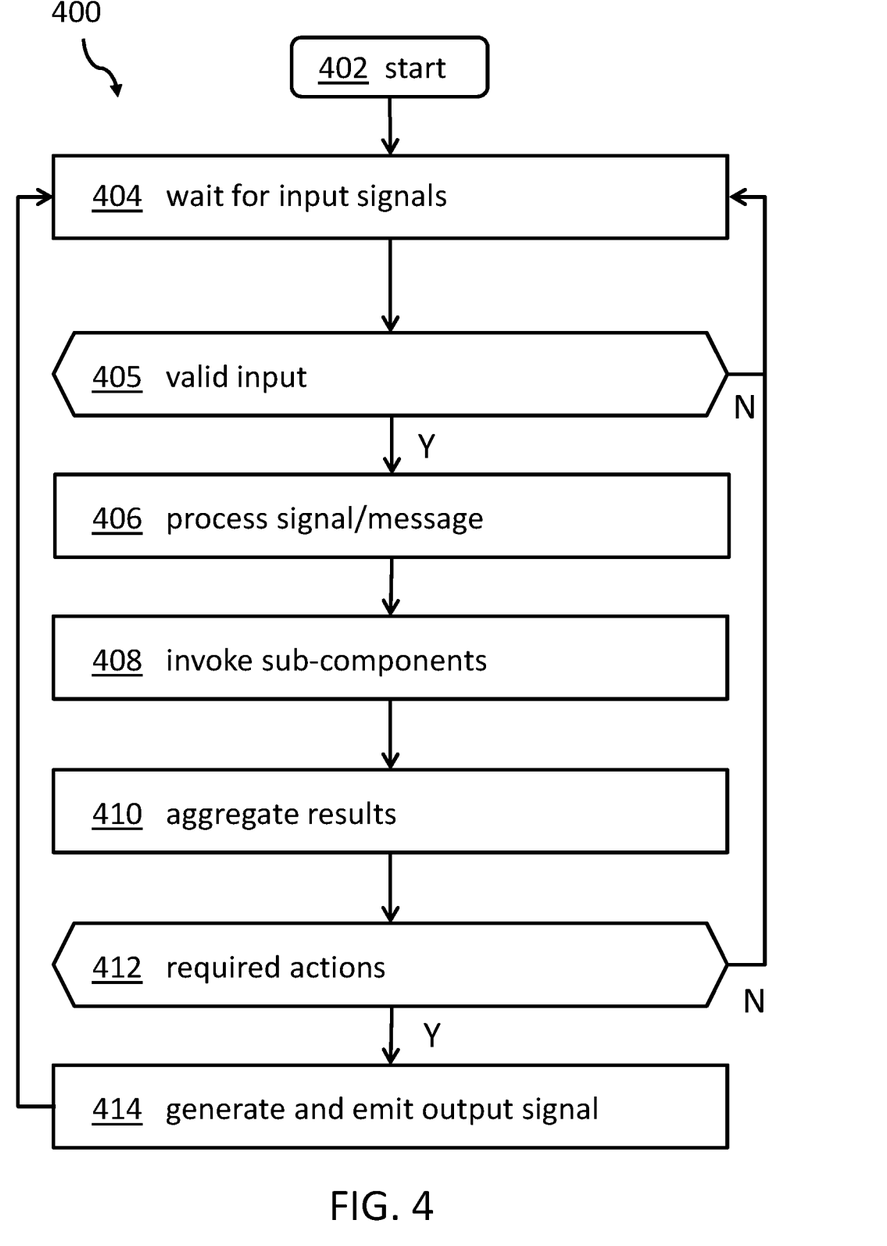
FIG. 4 shows a flowchart of the basic flow in the dynamic publishing engine.

FIG. 4 shows a flowchart 400 of the basic flow in the dynamic publishing engine. The process may start at 402. The process waits, 404, for the input messages from, e.g., the social network analyzer component, the request metering component or the authoring system. The validity of the input message is checked, 405. If the input message is not valid, the process goes back to the waiting 404.

In a next step, the input signal/message is processed, 406, as explained above. For that, one or more of the sub-components—in particular, the rules sub-component, the history sub-component, the cognitive sub-component and the workflow modification sub-component—are invoked, 408. The results are then aggregated, 410, and it is determined whether a specific action is required, 412. If no action is required, the process returns to the waiting 404. In case an action is required—case "Y"—the process generates and omits, 414, the related output signal(s)/message(s) as described above in more detail.

Figure 5:
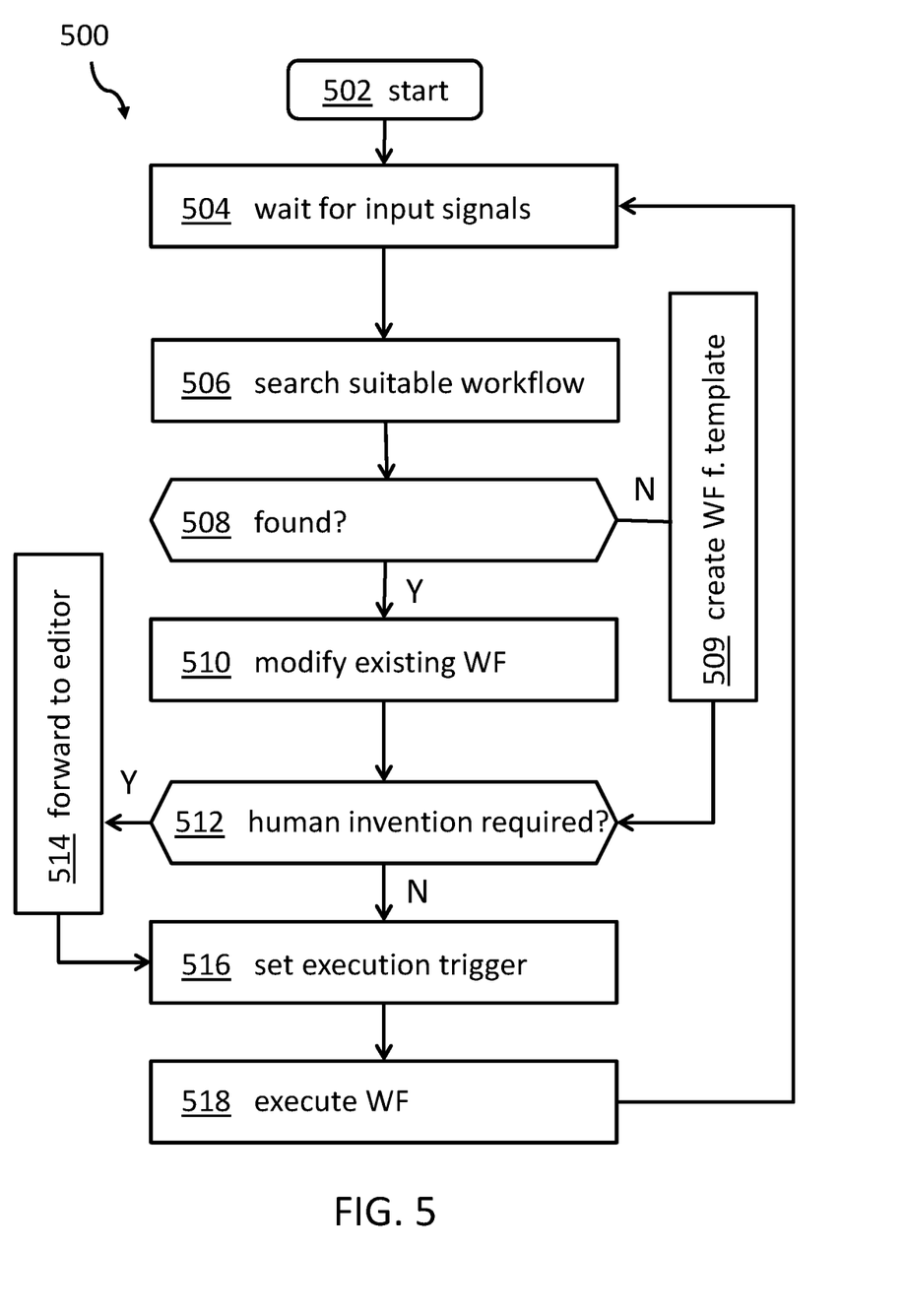
FIG. 5 shows a flowchart 500 of the basic flow in the workflow modification sub-component.

FIG. 5 shows a flowchart 500 of the basic flow in the workflow modification sub-component. The process starts at 502. It then waits, 504, for an input message which is the output signal of the dynamic publishing engine—compare, e.g., FIG. 4. Then, a search, 506, for a suitable workflow is performed. In case no suitable workflow or workflow template is found, 508—case "N"—a new workflow is created, 509, from a similar workflow template. For a similarity match respective metadata generated from the dynamic publishing engine, and metadata describing potential workflows in a workflow database (not shown), may be used.

If a suitable workflow is found—case "Y"—the existing workflow is modified, 510. It is then determined, 512 whether in additional human intervention is required. In case of "Y", the related content item is forwarded, 514, to an editor. Then—in both cases—an execution trigger is set, 516. The execution trigger may be executed delayed or immediately. Last but not least, the workflow is executed 518, before the process returns to the waiting 504 for input signals.

Figure 6:
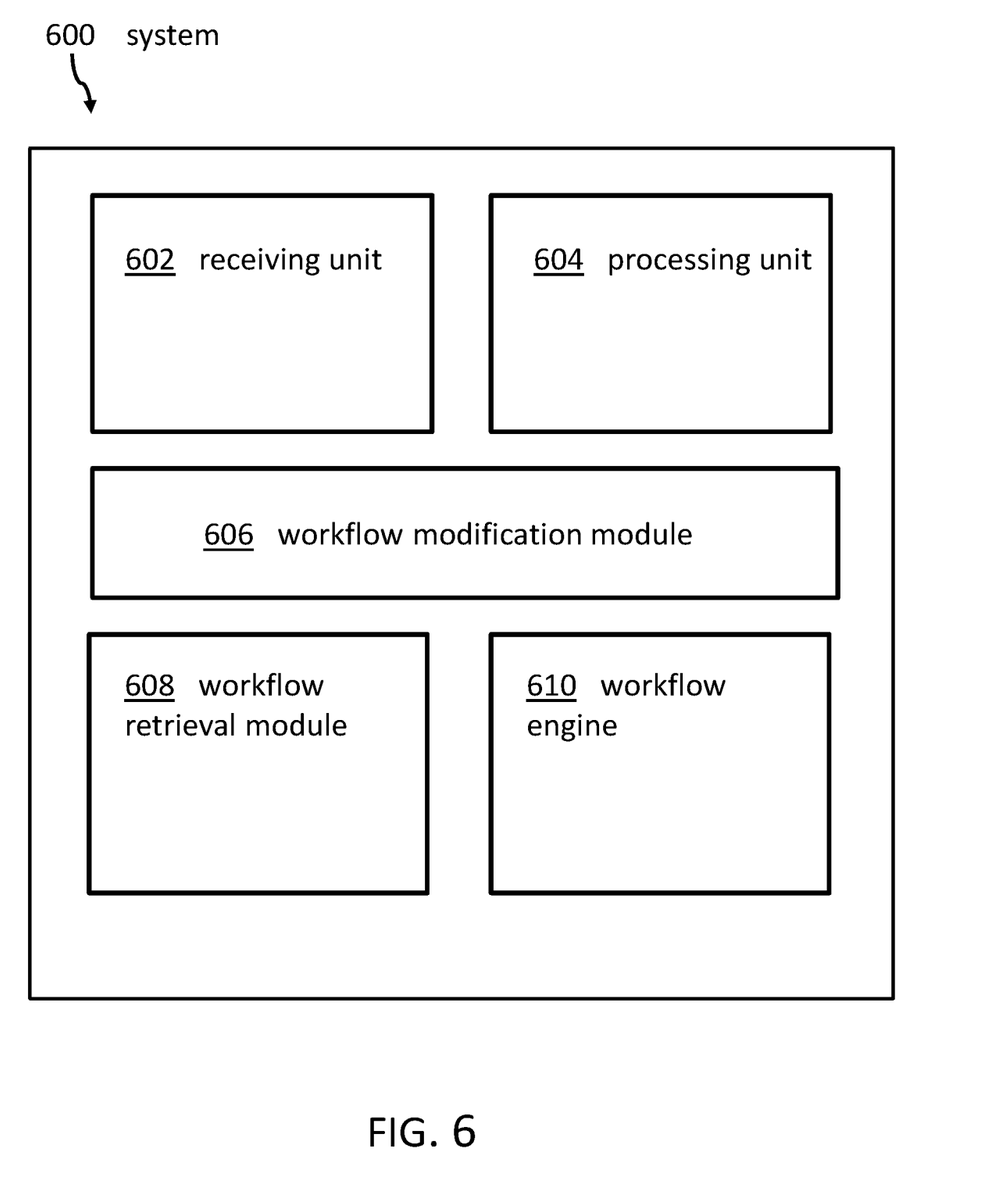
FIG. 6 shows a block diagram of an embodiment of the system for modifying a publishing workflow of a content management system.

FIG. 6 shows a block diagram of an embodiment of the system 600 for modifying a publishing workflow of a content management system. The system 600 comprises a receiving unit 602 adapted for receiving a trigger message indicative of a potential change to a publishing workflow and a processing unit 604 adapted for processing the trigger resulting in a workflow modification message. As before, the workflow modification message comprises at least one of a content item identifier, a related semantic identifier indicative of a semantic of the workflow modification message, and workflow characterizing metadata.

The system 600 comprises additionally a workflow retrieval module 606 adapted for retrieving a publishing workflow selectable by the workflow characterizing metadata, a workflow modification module 608 and a workflow engine 610 for executing the modified workflow.

Figure 7:
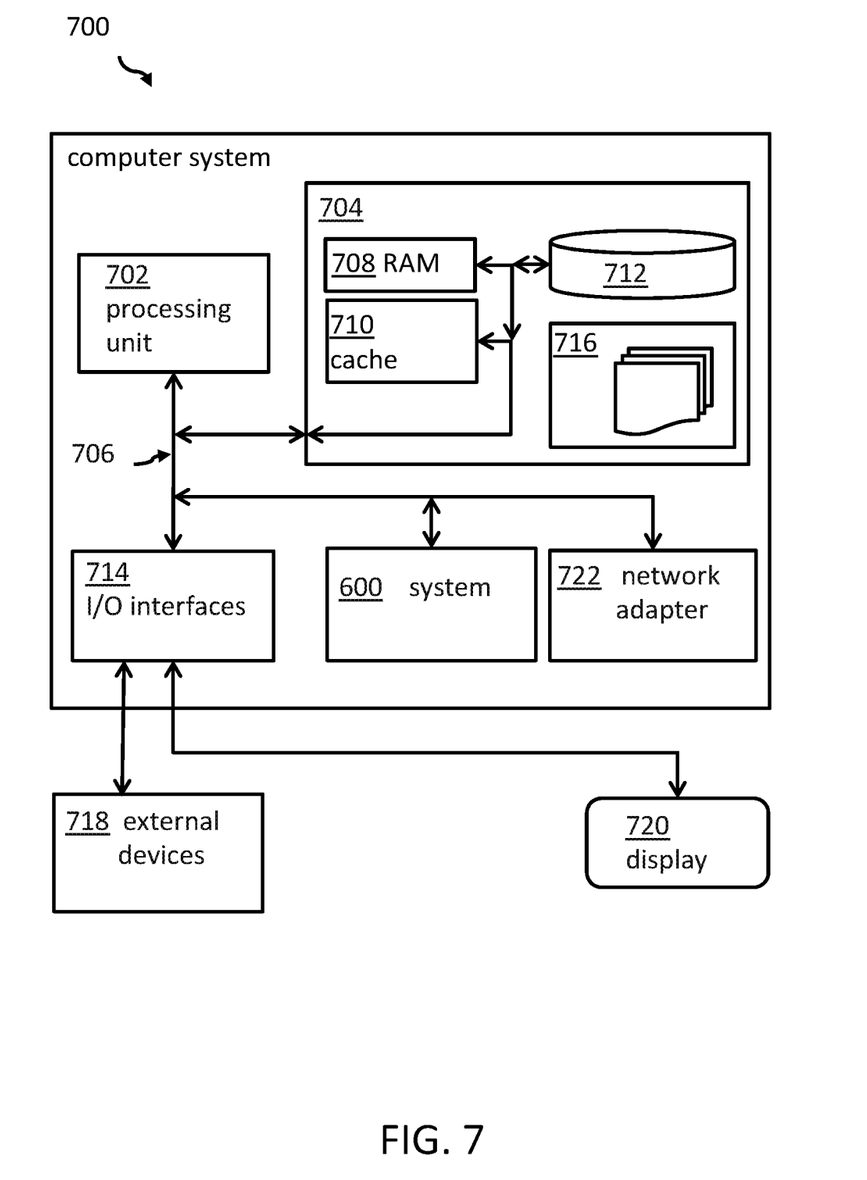
FIG. 7 shows a block diagram of a computing system comprising a system for modifying a workflow according to FIG. 6.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couples various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the system 600 for modifying a publishing workflow of a content management system may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method, comprising:
   receiving, by a processor, a trigger message indicative of a potential change to a publishing workflow;
   processing the trigger message resulting in a workflow modification message, the workflow modification message comprising a content item identifier, a related semantic identifier indicative of a semantic of the workflow modification message, and workflow characterizing metadata;
   retrieving the publishing workflow by selection using the workflow characterizing metadata; and
   modifying at least one publishing workflow action of the retrieved publishing workflow based on the workflow modification message, wherein modifying the at least one publishing workflow action of the retrieved publishing workflow comprises performing a modification selected from the group consisting of inserting, modifying, removing, and rearranging representations of at least one of the at least one publishing workflow action of the retrieved publishing workflow and a representation of at least one publishing workflow control construct of the retrieved publishing workflow.

2. The method of claim 1, where the trigger message is received from one of a social media network analyzer, a content request metering component, or a content management system.

3. The method of claim 1, where the processing of the trigger message is performed using at least one of a cognitive system, a history component, and a rules component.

4. The method of claim 1, where modifying the at least one publishing workflow action of the retrieved publishing workflow further comprises performing at least a workflow action selected from the group consisting of:
   an action for a content modification;
   an action for transferring a content item identified by the content item identifier to a content delivery system;
   an action for an un-publishing of the content item by the content delivery system;
   an action for modifying a state of an authoring component;
   an action for modifying a ranking model of a search component related to the content item;
   an action for waiting on an event from the content delivery system; and
   an action for retrieving content data of the content item from a component of a content management system or another system.

5. The method of claim 1, where the publishing workflow is defined using Business Process Execution Language (BPEL).

6. The method of claim 1, further comprising storing the trigger message in a history database.

7. The method of claim 1, further comprising comparing content of the trigger message with a threshold value.

8. The method of claim 1, where an authoring component and a content delivery system are non-integrated.

9. The method of claim 1, where retrieving the publishing workflow further comprises searching for the publishing workflow in a workflow database using a fuzzy search technique.

10. A dynamic publishing system, comprising:
    a receiving unit; and
    a processor programmed to:
      receive, via the receiving unit, a trigger message indicative of a potential change to a publishing workflow;
      process the trigger message resulting in a workflow modification message, the workflow modification message comprising a content item identifier, a related semantic identifier indicative of a semantic of the workflow modification message, and workflow characterizing metadata;
      retrieve the publishing workflow by selection using the workflow characterizing metadata; and
      modify at least one publishing workflow action of the retrieved publishing workflow based on the workflow modification message, wherein the processor is programmed to perform a modification selected from the group consisting of inserting, modifying, removing, and rearranging representations of at least one of the at least one publishing workflow action of the retrieved publishing workflow and a representation of at least one publishing workflow control construct of the retrieved publishing workflow.

11. The system of claim 10, where, in being programmed to receive the trigger message, the processor is programmed to receive the trigger message from one of a social media network analyzer, a content request metering component, or a content management system.

12. The system of claim 10, where, in being programmed to process the trigger message, the processor is programmed to use at least one of a cognitive system, a history component, and a rules component.

13. The system of claim 10, where, in being programmed to modify the at least one publishing workflow action of the retrieved publishing workflow, the processor is programmed to perform at least a workflow action selected from the group consisting of:
- an action for a content modification;
- an action for transferring a content item identified by the content item identifier to a content delivery system;
- an action for an un-publishing of the content item by the content delivery system;
- an action for modifying a state of an authoring component;
- an action for modifying a ranking model of a search component related to the content item;
- an action for waiting on an event from the content delivery system; and
- an action for retrieving content data of the content item from a component of a content management system or another system.

14. The system of claim 10, where the publishing workflow is defined using Business Process Execution Language (BPEL).

15. The system of claim 10, further comprising a history database, and where the processor is further programmed to store the trigger message in the history database.

16. The system of claim 10, where the processor is further programmed to:
compare content of the trigger message with a threshold value; and
where, in being programmed to retrieve the publishing workflow, the processor is further programmed to search for the publishing workflow in a workflow database using a fuzzy search technique.

17. The system of claim 10, where an authoring component and a content delivery system are non-integrated.

18. A computer program product, comprising:
a computer readable storage medium having computer readable program code embodied therewith, where the computer readable storage medium is not a transitory signal per se and where the computer readable program code when executed on a computer causes the computer to:
receive a trigger message indicative of a potential change to a publishing workflow;
process the trigger message resulting in a workflow modification message, the workflow modification message comprising a content item identifier, a related semantic identifier indicative of a semantic of the workflow modification message, and workflow characterizing metadata;
retrieve the publishing workflow by selection using the workflow characterizing metadata; and
modify at least one publishing workflow action of the retrieved publishing workflow based on the workflow modification message, modifying the at least one publishing workflow action of the retrieved publishing workflow comprises performing a modification selected from the group consisting of inserting, modifying, removing, and rearranging representations of at least one of the at least one publishing workflow action of the retrieved publishing workflow and a representation of at least one publishing workflow control construct of the retrieved publishing workflow.

* * * * *